UNITED STATES PATENT OFFICE.

MAX BAZLEN, OF LUDWIGSHAFEN-ON-THE-RHINE, GERMANY, ASSIGNOR TO THE BADISCHE ANILIN & SODA FABRIK, OF LUDWIGSHAFEN-ON-THE-RHINE, GERMANY, A CORPORATION OF BADEN.

PROCESS OF MAKING STABLE DRY HYDROSULFITES.

No. 795,755.   Specification of Letters Patent.   Patented July 25, 1905.

Application filed April 29, 1904. Serial No. 205,625.

*To all whom it may concern:*

Be it known that I, MAX BAZLEN, doctor of philosophy and chemist, a subject of the King of Würtemberg, residing at Ludwigshafen-on-the-Rhine, in the Kingdom of Bavaria, German Empire, have invented new and useful Improvements in Stable Dry Hydrosulfites, of which the following is a specification.

Various processes have been proposed for the purpose of obtaining hydrosulfites in a stable form. For instance, it has been proposed to wash the freshly-prepared hydrosulfite with a liquid, such as alcohol, which easily mixes with water and which rapidly evaporates, (see the specifications of Letters Patent Nos. 662,338 and 662,339.) It has also been proposed to form stable pastes by mixing the hydrosulfite with alcohol or a similar liquid and also to dry the hydrosulfite in a vacuum with or without previously washing with a suitable liquid and then preserving the dried compound in an atmosphere of an inert gas, (see the specification of British Letters Patent No. 18,852, A. D. 1900;) but the production of the large quantities of inert gas required is expensive, and also the water of crystallization cannot be entirely removed without causing a partial decomposition of the hydrosulfite. I have now discovered that hydrosulfites can be obtained in a stable dry form by heating them with a liquid which has the power of taking up water and afterward drying the hydrosulfites. The products thus obtained are new, being free from water, dry and stable, and differing from the hydrosulfites described in the British Letters Patent No. 18,852 of 1900 in being free from inert gas. Liquids specially suitable for the purposes of my invention are methyl alcohol, ethyl alcohol, and acetone; but other alcohols and ketones and also esters, such as ethyl acetate, and other liquids having the aforesaid quality can be employed. It is very advantageous to dry the liquid during the process, for then its power of taking up water is always at a maximum and the hydrosulfite becomes more quickly free from water. Suitable drying agents for this purpose include quicklime, calcium chlorid, sodium hydroxid, potassium hydroxid, dried sodium carbonate or potassium carbonate, anhydrous sodium sulfate, and the like, and these may act either on the liquid itself or when it is in the form of vapor. The temperature at which the extraction can be carried out may be varied within wide limits, for I have discovered that whereas under ordinary circumstances hydrosulfites rapidly decompose upon being even slightly heated yet when proceeding according to my invention hydrosulfites which contain water of crystallization or even free water can be heated to a fairly high temperature without decomposition when in the presence of one of the above-mentioned liquids. Thus potassium hydrosulfite, which under ordinary circumstances begins to decompose at a temperature of $20°$ centigrade, can be safely heated in boiling methyl alcohol, while sodium hydrosulfite in the presence of one of the above-mentioned liquids can be heated to a temperature of $100°$ centigrade, and the zinc double salts under these circumstances can be heated to still higher temperatures without decomposition or intramolecular change setting in.

I have found that the best method of carrying out my invention consists in extracting the hydrosulfite with the boiling liquid, always making use of a liquid boiling at a temperature below that at which the hydrosulfite dealt with begins to decompose. A liquid, such as amyl alcohol, whose boiling-point under the ordinary atmospheric pressure lies above the temperature at which the hydrosulfite decomposes, can be used when the extraction takes place under reduced pressure, so that the boiling-point of the liquid under this reduced pressure lies below the decomposition-point of the hydrosulfite. Similarly the temperature at which the extraction with a liquid of low boiling-point—for example, ether—takes place can be raised by carrying out the extraction under a pressure greater than the atmospheric pressure. In all cases it is advisable to arrange the process so that the extracting liquid after leaving the hydrosulfite is brought into contact with a drying agent, such as one of those hereinbefore mentioned. The water is thus taken out of the extracting liquid, so that the hydrosulfite is always being treated with a liquid which is free from water, and consequently the operation is expedited. After the extraction the hydrosulfite is dried at a temperature of from sixty to eighty degrees centigrade ($60°-80°$ C.) and can also be further dried in a vacuum over sulfuric acid. By making use of a suitable liquid, temperature, and time of operation I am able to remove not only free water, but also water of crystallization from the hydrosulfite without decomposition of the latter setting in and am able to obtain products which contain almost one hundred per cent. of pure hydrosulfite and which are very stable, not only in closed vessels, but also when exposed to the air. Instead of extracting the hydrosulfite with a boiling liquid the operation may be so arranged that the vapor of the liquid is passed over the salt. This also effects the removal of the water.

The following examples will serve to further illustrate the nature of my invention, which, however, is not limited to these examples. The parts are by weight.

Example 1: Wash with alcohol solid sodium hydrosulfite, such as can be obtained from its concentrated solutions by the addition of easily-soluble salts—such as common salt, sodium nitrite, sodium nitrate, sodium acetate, anhydrous sodium carbonate, anhydrous sodium sulfate, sodium bisulfite, and the like. Extract seventy (70) parts of the paste so obtained, which contains sixty (60) per cent. of $Na_2S_2O_4$, with boiling ethyl alcohol for from four to six (4–6) hours. If fifty (50) parts of ethyl alcohol be used, this should be kept free from water during the extraction by the use of from twenty to thirty (20–30) parts of quicklime. After the extraction either filter and press off the alcohol or else distil it off under reduced pressure at a temperature of seventy degrees centigrade, (70° C.) Place the sodium hydrosulfite, which is already fairly dry, in a vacuum over sulfuric acid until it is completly dry and then release the vacuum by allowing air to flow in. In this way a sodium hydrosulfite is obtained which contains from ninety-six to ninety-eight (96–98) per cent. of the pure compound and which is extremely stable in the air. A test portion on being exposed to the air for fourteen days was found to contain exactly as much $Na_2S_2O_4$ after the exposure as before.

Instead of ethyl alcohol in this example methyl alcohol or ethyl acetate may be employed, or amyl alcohol (fusel-oil) under reduced pressure or ether under increased pressure may be used.

Example 2: Mix into a paste with methyl alcohol ten (10) parts of solid potassium hydrosulfite, such as can be obtained, for instance, by the addition of potassium carbonate or of alcohol, to a highly-concentrated solution of the hydrosulfite, and which consists of sulfur-yellow crystals containing three (3) molecules of water of crystallization. Extract this paste with forty (40) parts of boiling methyl alcohol for from six to eight (6–8) hours, carrying out the extraction in an apparatus provided with a reflux condenser and drying the alcohol during the extraction by means of from fifteen to twenty (15–20) parts of quicklime. The yellow color of the crystals gradually disappears and a white salt is left. Dry this in a vacuum at a temperature of from fifty to sixty degrees centigrade, (50°–60° C.,) finally using sulfuric acid to absorb the alcohol-vapor. According to this process the potassium hydrosulfite, which usually very readily decomposes, is obtained in a stable dry form.

Example 3: Wash with ethyl alcohol solid zinc hydrosulfite, such as can be obtained by stirring fifteen (15) parts of zinc-dust with twenty-five (25) parts of water at a temperature of from thirty to forty-five degrees centigrade, (30°–45° C.,) passing a strong current of sulfur dioxid into the mixture until the zinc-dust is almost entirely used up and then allowing the solution to stand and finally filtering off and pressing the zinc hydrosulfite. After washing extract this zinc hydrosulfite for several hours with boiling ethyl alcohol, drying the alcohol by means of quicklime. Dry the product so obtained in a vacuum at a temperature of from sixty to seventy degrees centigrade (60°–70° C.) finally in the presence of sulfuric acid.

Instead of ethyl alcohol in this example acetone may be employed, and this during the extraction can be dried by means of calcium chlorid.

The zinc hydrosulfite is thus obtained in the form of a white stable powder which is easily soluble in water.

Other hydrosulfites can be treated in manners similar to those described in the above examples—such, for example, as the zinc-sodium, the zinc-potassium, and the zinc-ammonium hydrosulfites, which can be obtained by treating a zinc-hydrosulfite solution with a sodium, a potassium, or an ammonium salt, respectively, or the double salts, which can be obtained directly from a bisulfite, zinc-dust, and sulfur dioxid or from a bisulfite, zinc-dust, and sulfuric acid.

Now what I claim is—

1. The process for the production of stable, dry hydrosulfites, which consists in extracting the hydrosulfites which contain combined water with a hot fluid which has the property of taking up water until all the water, both combined and uncombined, has been removed.

2. The process for the production of stable, dry hydrosulfites, which consists in extracting the hydrosulfites which contain combined water with a hot fluid which has the property of taking up water until all the water, both combined and uncombined, has been removed, and at the same time treating the extracting fluid with a desiccating agent.

3. The process for the production of stable, dry hydrosulfites which consists in extracting the hydrosulfites which contain combined water with a hot liquid which has the property of taking up water until all the water, both combined and uncombined, has been removed.

4. The process for the production of stable, dry hydrosulfites, which consists in extracting the hydrosulfites which contain combined water with a hot liquid which has the property of taking up water until all the water, both combined and uncombined, has been removed, and at the same time treating the extracting liquid with a desiccating agent.

5. The process for the production of stable, dry hydrosulfites, which consists in extracting the hydrosulfites which contain combined water with hot ethyl alcohol, until all the water, both combined and uncombined, has been removed.

6. The process for the production of stable, dry hydrosulfites, which consists in extracting the hydrosulfites which contain combined water with hot ethyl alcohol until all the water, both combined and uncombined, has been removed, and at the same time treating the ethyl alcohol with a desiccating agent.

In testimony whereof I have hereunto set my hand in the presence of two subscribing witnesses.

MAX BAZLEN.

Witnesses:
ERNEST F. EHRHARDT,
J. ALEC. LLOYD.